F. G. HODELL.
CHAIN LINK.
APPLICATION FILED FEB. 27, 1920.

1,368,437.

Patented Feb. 15, 1921.

*Old Form*

Inventor:
Frederick G. Hodell,
by
Freese, Mershal & Seywell,
his attorneys.

UNITED STATES PATENT OFFICE.

FREDERICK G. HODELL, OF CLEVELAND, OHIO.

CHAIN-LINK.

1,368,437. Specification of Letters Patent. Patented Feb. 15, 1921.

Application filed February 27, 1920. Serial No. 361,689.

*To all whom it may concern:*

Be it known that I, FREDERICK G. HODELL, a citizen of the United States, resident of Cleveland, county of Cuyahoga, and State of Ohio, have invented new and useful Improvements in Chain-Links, of which the following is a specification, the principle of the invention being herein explained and the best mode in which I have contemplated applying that principle, so as to distinguish it from other inventions.

My invention relates to links for use in chains, its object being to provide a link having a maximum strength which may be manufactured and assembled to form chains, in an economical manner.

Links have heretofore been used having the general characteristics of my improved link, but the form thereof has been such that under extreme or extraordinary tension the links became distorted and the "tie" on the link sometimes broke down, so that the full tensile strength of the wire of the link became unavailable. The specific object of my invention therefore is to so modify this old form of link as to increase the strength of the "tie" and thus permit the ultimate tensile strength of the wire to be utilized and applied in the chain of which the link forms a part.

This object I attain by decreasing the angularity of the terminal portion of the wire of which the links are formed, in relation to the plane of the eyes formed by such terminal portions, all as will hereinafter fully appear.

I produce a link therefore, of which one side is made to take a nearly straight direct pull along the length of the wire and in which the other side of the link is made as strong as or stronger than the nearly straight wire on the other side of the link and I effect this by bringing the ends of the wire into interlocked engagement with each other, the ends being bent or knotted about the nearly straight wire and bent where they cross at a sharp angle toward each other, whereby at this point the ends are in more or less hooked relation to each other as distinguished from the wedging or oblique engagement usually formed.

Figure 1:
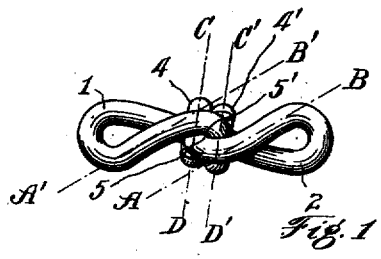
Figures 1, 2, 3 and 4 represent respectively a front elevation, a top plan, a rear elevation and a bottom plan of a link embodying my invention (the terms top, front, bottom and rear being used for convenience of description only, since the links actually have no such directional limitation).

Referring first to the old form of link illustrated by Figs. 5, 6, 7 and 8, it will be noted that it is constructed of a single piece of wire or rod bent to form two oppositely disposed end loops 1 and 2. The terminal portions of this wire cross each other at the point 3, Fig. 7, and are then bent in preferably but not necessarily opposite directions around the oppositely disposed side of the link to form knots or eyes 4 and 4', in contact with each other, as shown in the drawings. The two end loops lie in planes substantially at right angles with each other.

Figure 5:
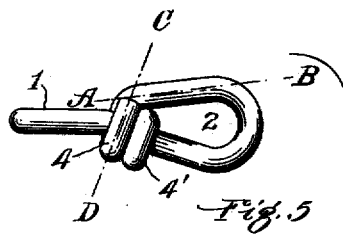
Figs. 5, 6, 7 and 8 represent respectively a top plan, front elevation, bottom plan and rear elevation of an old and well known type of link upon which my invention constitutes an improvement.
Figure 2:
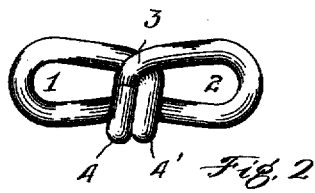
Figure 6:
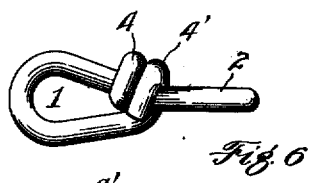
Figure 3:
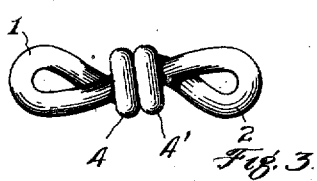
Figure 7:
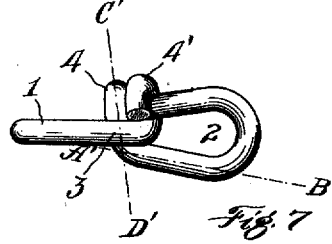
Figure 4:
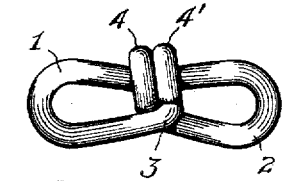
Figure 8:
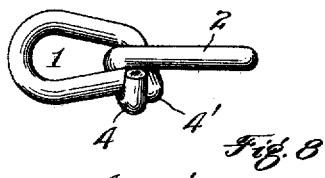
Figure 9:
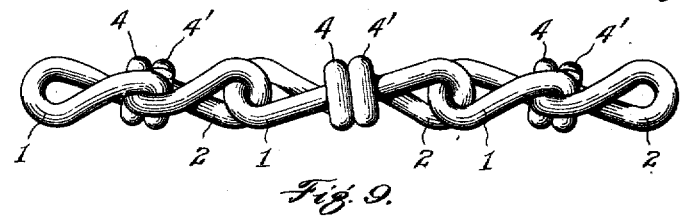
Fig. 9 represents a front elevation of a section of chain built up from links made in accordance with my invention.

The said terminal portions of the wire are so bent that the axes A—B and A'—B' of the main portions thereof form an obtuse angle with the planes C—D and C'—D' respectively of the eyes formed thereon, as shown in Figs. 5 and 7. It will be observed that in this construction a great deal of the pulling force applied to the links will be transmitted to the eyes since the pull upon the axes becomes a wedging action, with a resultant tendency to open them up.

My improved form of link, as shown in Figs. 1, 2, 3 and 4, obviates this defect, and this is accomplished by imparting a twist in opposite directions to the loops 1 and 2 so as to reduce the angles previously referred to, to less than obtuse angles, as shown in Fig. 1, in which latter the angles formed by the axial lines A—B and A'—B' with the planes C—D and C'—D' of the eyes, are shown to be acute angles, the amount of twist imparted approximating 90 degrees. Such formation causes the two loops to lie in formation surfaces respectively, and produces pronounced shoulders at 5 and 5', Fig. 1, which lock with each other and take the force of the pull off the eyes or "tie" of the link. It happens from this also that the eyes are made to take position around the straight side or member of the link, substantially at right angles to the direction of the straight side and to the direction of pull. It thus happens that the ends of the piece of wire which forms the link are in what may be termed "multiple hook" engagement. The eyes are hooked about the main strand; they are opposed to each other directly across the line of pull and they have a third engagement where the ends cross each other. There is little tendency of the ends to slide upon each other under pull, hence no wedging action whereby the pull is resolved into a wedging force resultant at the eyes and tending to open them up. By providing these accentuated shoulders, and especially by imparting to them the acute angularity referred to, the full tensile strength of the wire is found to be available, thus imparting to this form of link its maximum strength.

What I claim is:

1. A chain link composed of a single piece, one side of the link being a continuous strand and the other side made of the ends, forming eyes about the continuous strand, said ends crossing at a sharp angle and engaging each other on faces substantially perpendicular to the direction of pull, whereby sliding and wedging action under pull is avoided.

2. A chain link formed from a single piece of wire bent so as to form twisted loops at the ends of the link, the ends bent or knotted about the middle part of the wire at right angles thereto, in engaging relation to each other, said wires crossing and having sharp bends where they cross, whereby pull upon the link is translated into pull of the eyes against each other without sliding or wedging action.

3. A chain link comprising a single unitary length of wire bent to form two oppositely disposed loops; the end portions of said wire crossing each other at one side of the link and bent around the other side thereof in opposite directions to form two eyes in contact with each other; the two loops being twisted in opposite directions so as to be bent each in opposite direction from the bent end whereby to impart acutely angular engagement and make the link have the full strength of the wire.

4. A chain link comprising a single unitary length of wire bent to form two oppositely disposed loops; the end portions of said wire crossing each other at one side of the link and bent around the other side thereof in opposite directions to form two eyes in contact with each other; that part of each such terminal portion adjacent to the eye formed thereon forming an angle less than an obtuse angle with the plane of such eye.

5. A chain link comprising a single unitary length of wire bent to form two oppositely disposed loops; the end portions of said wire crossing each other at one side of the link and bent around the other side thereof in opposite directions to form two eyes in contact with each other; that part of each such terminal portion adjacent to the eye formed thereon forming an acute angle with the plane of such eye.

Signed by me this 24th day of February, 1920.

FREDERICK G. HODELL.